United States Patent
Roy

(10) Patent No.: US 9,426,036 B1
(45) Date of Patent: Aug. 23, 2016

(54) MIXTURE MODEL APPROACH FOR NETWORK FORECASTING

(71) Applicant: Amazon Technologies, Inc., Reno, NV (US)

(72) Inventor: Sonali Roy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 386 days.

(21) Appl. No.: 14/037,565

(22) Filed: Sep. 26, 2013

(51) Int. Cl.
  *H04L 12/26* (2006.01)
  *G01R 31/08* (2006.01)
  *H04L 12/24* (2006.01)
  *G06N 99/00* (2010.01)

(52) U.S. Cl.
  CPC .............. *H04L 41/147* (2013.01); *G06N 99/00* (2013.01)

(58) Field of Classification Search
  None
  See application file for complete search history.

(56) References Cited

U.S. PATENT DOCUMENTS

| | | | | |
|---|---|---|---|---|
| 8,995,249 B1* | 3/2015 | Roy | ...... | H04L 41/147 370/216 |
| 2004/0214577 A1* | 10/2004 | Borst | ...... | H04W 16/18 455/446 |
| 2005/0131790 A1* | 6/2005 | Benzschawel | ...... | G06N 3/02 705/35 |
| 2007/0203862 A1* | 8/2007 | Sekiai | ...... | G05B 13/048 706/16 |
| 2012/0245050 A1* | 9/2012 | Hiroi | ...... | C12Q 1/6883 506/9 |
| 2014/0052850 A1* | 2/2014 | Doorhy | ...... | H04L 43/0876 709/224 |
| 2014/0100989 A1* | 4/2014 | Zhang | ...... | G06Q 30/0283 705/26.61 |
| 2015/0032674 A1* | 1/2015 | Cichosz | ...... | G06N 5/003 706/12 |
| 2015/0079100 A1* | 3/2015 | Roy | ...... | C07K 16/2818 424/142.1 |

* cited by examiner

*Primary Examiner* — Kakali Chaki
*Assistant Examiner* — Michael Zidanic
(74) *Attorney, Agent, or Firm* — Thomas | Horstemeyer, LLP

(57) ABSTRACT

Disclosed are various embodiments that provide a mixture model approach to network forecasting. Network traffic models are generated for multiple host types. Weights are determined for the network traffic models. A network forecast is generated based at least in part on a hardware footprint forecast and on the network traffic models as weighted by the determined weights.

20 Claims, 5 Drawing Sheets

MIXTURE MODEL APPROACH FOR NETWORK FORECASTING

BACKGROUND

Service forecasts are unreliable for long-term network capacity planning due to their volatility. Such forecasts may vary widely from week to week and cannot be reliably employed in managing long-term network capacity planning for dates that may be six months or more in the future. Reliance on such forecasts may result in poor preparation for unanticipated growth in network traffic.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a mixture model approach for network forecasting. Both service forecasts and hardware footprint forecasts may be available for a network. Service forecasts may indicate the demand for various services provided within the network, e.g., storage services, database services, electronic commerce services, utility computing services, and so on. Service forecasts may include host type forecasts for various types of hosts employed by the services. Hardware footprint forecasts may indicate actual and planned deployments for different configurations of computing devices and/or racks of such computing devices. Though potentially reliable for short-term network capacity planning (e.g., one to three months in the future), service forecasts may be unreliable for long-term network capacity planning due to their high volatility. By contrast, hardware footprint forecasts may be more reliable for long-term planning (e.g., six months or more in the future) but may not capture nearer-term information such as product launches.

Various embodiments of the present disclosure provide for a mixture model approach that incorporates both service forecasts and hardware footprint forecasts in order to generate combination forecasts for network capacity planning. A mixture model approach is desirable because it accommodates the different reliabilities from the different types of forecasts. In other words, a mixture model approach will draw most heavily from the most accurate source for a given time period, while drawing least from inaccurate sources. The mixture model approach may be utilized to forecast computing devices of different configurations behind a layer of the network. Using historical data, network traffic may be estimated for the forecasted computing devices. The estimated network traffic may then be used to forecast network capacity needs.

Figure 1:
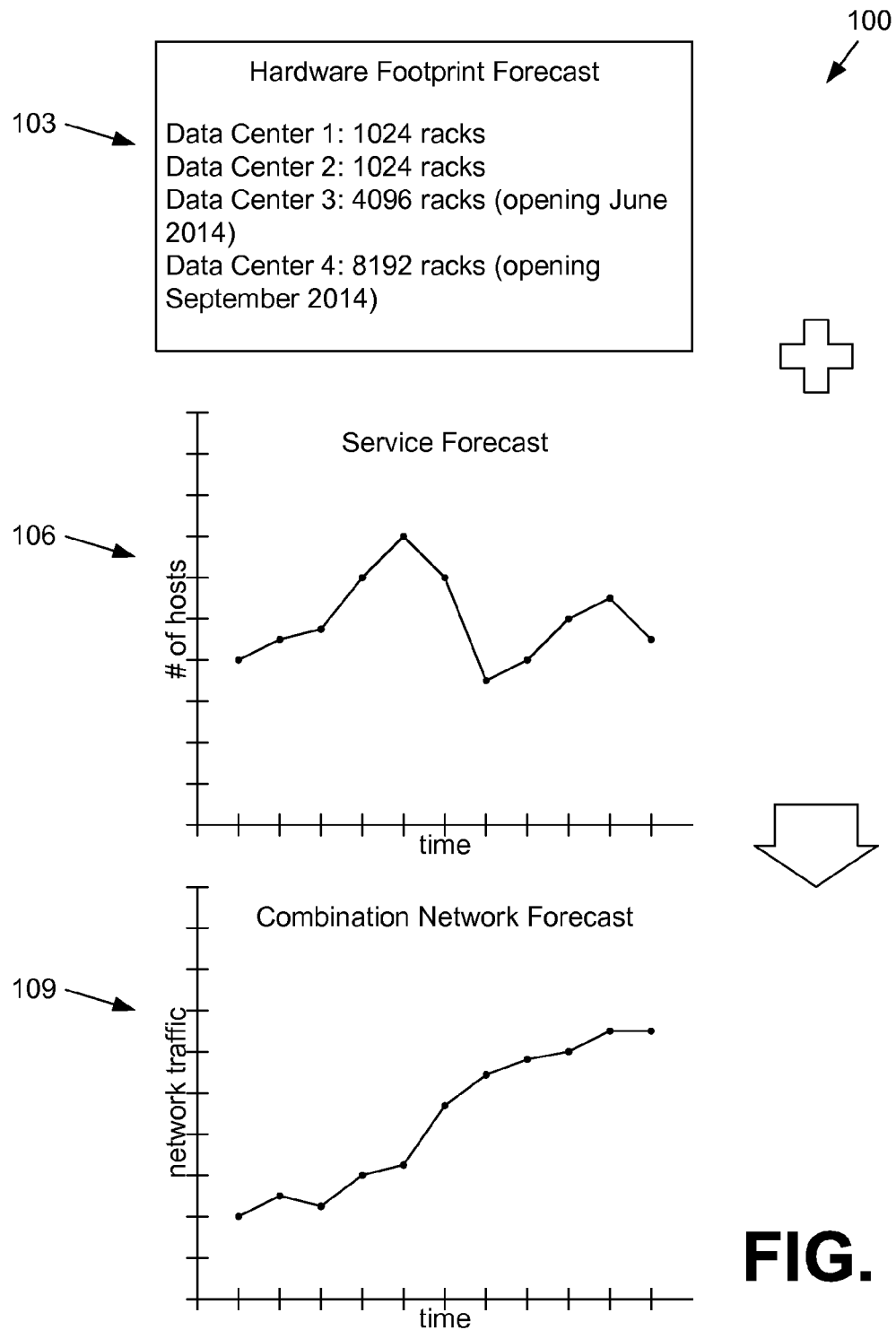
FIG. 1 depicts an example scenario illustrating the use of a mixture model for network forecasting according to various embodiments of the present disclosure.

With reference to FIG. 1, shown is an example scenario 100 illustrating the use of a mixture model for network forecasting according to various embodiments. In the example scenario 100, a hardware footprint forecast 103 and a service forecast 106 may be provided in order to generate a combination network forecast 109. As used herein, a "forecast" may encompass a specific predicted value or a predicted time series of values. The hardware footprint forecast 103 may indicate the current hardware footprint status of existing data centers as well as projected changes in existing data centers and additions of new data centers. In this non-limiting example, "data center 1" and "data center 2" each have an existing hardware footprint of "1024 racks." "Data center 3" has a projected hardware footprint of "4096 racks," and "data center 4" has a projected hardware footprint of "8192 racks." Although the hardware footprints are discussed in this example in terms of racks, the hardware footprints in other examples may be provided in terms of device capacity, floor area, utility capabilities, and/or other metrics for a data center. In one embodiment, the hardware footprint forecasts 103 are manually created by engineers or other design specialists in charge of management and build out of data centers.

The service forecast 106 in this non-limiting example is a host type forecast for a number of hosts of a given type over time. The service forecast 106 may have a relatively great volatility, e.g., the hosts of a given type in use may vary widely. The service forecast 106 may depend on various events such as product launches, pricing changes, and other events that may impact service usage. Various network services in an organization may employ specific types of hosts, and forecasts created for several different services may be aggregated to provide a forecast for specific types of hosts. Such service forecasts 106 may be provided in terms of network traffic and/or hardware usage (e.g., hosts of a given host type, racks containing hosts of a given host type, computing devices of a given type, and so on).

The output of the mixture model as will be described may be a combination network forecast 109. The combination network forecast 109 takes into account both the hardware footprint forecast 103 and the service forecast 106 to generate a combination forecast for network traffic or network capacity over time. To this end, the combination network forecast 109 may take into account multiple service forecasts 106 relating to multiple different types of hosts. In the following discussion, a general description of the system and its components is provided, followed by a discussion of the operation of the same.

Figure 2:
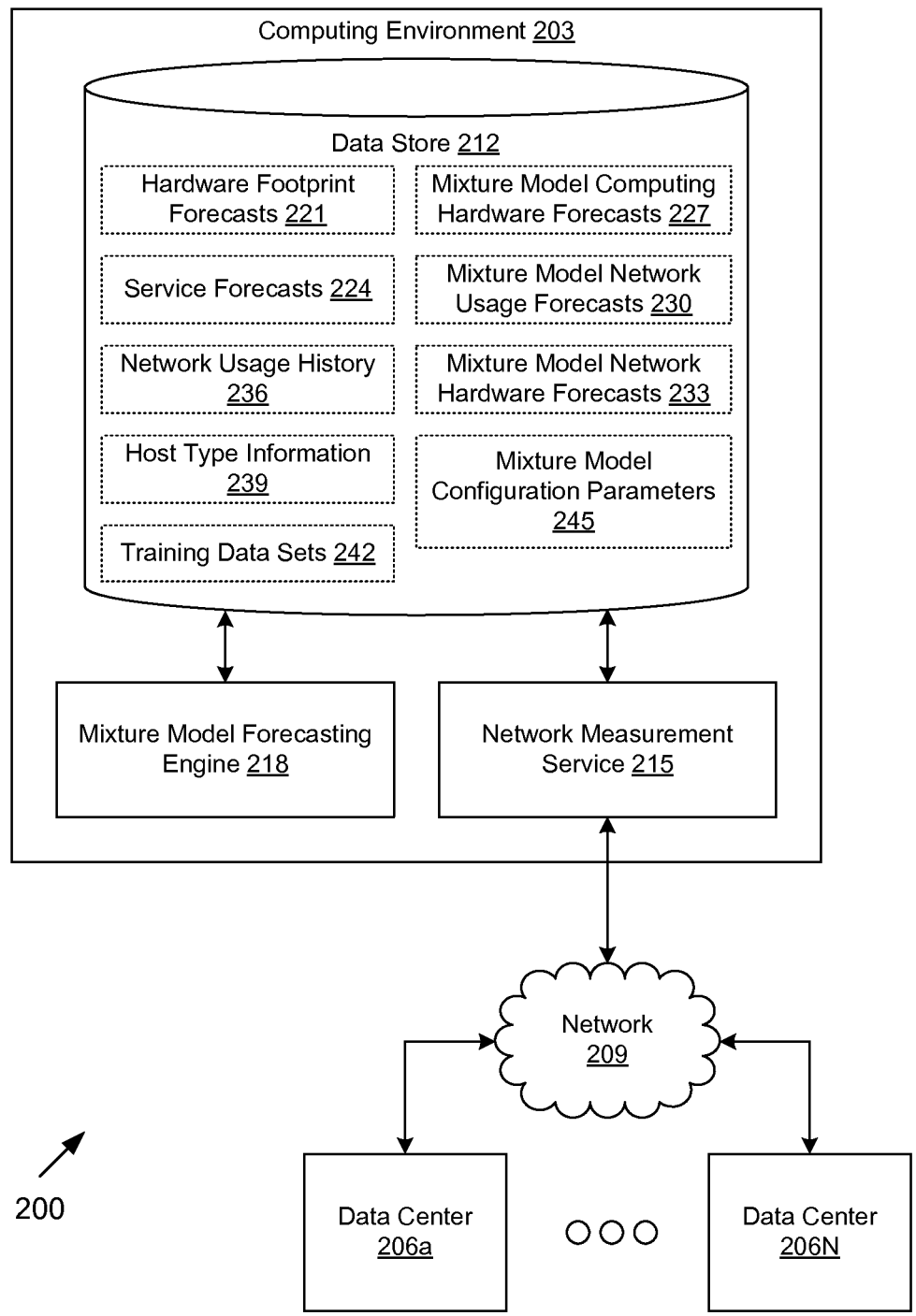
FIG. 2 is a drawing of a networked environment according to various embodiments of the present disclosure.

Turning now to FIG. 2, shown is a networked environment 200 according to various embodiments. The networked environment 200 includes a computing environment 203 in data communication with a plurality of data centers 206a . . . 206N by way of a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

Although the discussion herein refers to data centers 206, it is understood that the principles of the present disclosure may apply similarly to availability zones. Availability zones may correspond to a distinct location of computing devices that is engineered to be insulated from failures in other availability zones. In one embodiment, an availability zone may correspond to a data center 206. In other embodiments, an availability zone may correspond to a floor, a portion of a floor, a rack, or another location within a data center 206. Because each availability zone is configured to fail independently of the other availability zones, each availability zone may be provided, for example, with a distinct generator or other backup power source, a distinct connection to the power grid, a distinct connection to the network 209, distinct equipment facilitating power and/or network 209 connections, distinct heating and/or cooling equipment, distinct fire protection, and/or other features. Thus, multiple availability zones may be housed within a single data center 206 or separate data centers 206 depending in part on the available resources at a data center 206.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time. In some embodiments, the computing environment 203 may comprise one or more client computing devices such as, for example, desktop computers, laptop computers, personal digital assistants, cellular telephones, smartphones, set-top boxes, music players, web pads, tablet computer systems, game consoles, electronic book readers, or other devices with like capability.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include a network measurement service 215, a mixture model forecasting engine 218, and other applications, services, processes, systems, engines, or functionality not discussed in detail herein. The network measurement service 215 is executed to provide network usage data for use in generating network forecasts. Specifically, the network measurement service 215 may be capable of querying various devices in the network 209 to provide network utilization information for network links between nodes. Additionally, the network measurement service 215 may be capable of determining network bandwidth consumed by various services and/or hosts operating in the data centers 206. The network measurement service 215 may obtain network information via simple network management protocol (SNMP) and/or other protocols.

The mixture model forecasting engine 218 is executed to generate network forecasts by applying a mixture model to combine hardware footprint forecasts 221 with service forecasts 224. The output forecasts may correspond to a mixture model computing hardware forecast 227, a mixture model network usage forecast 230, a mixture model network hardware forecast 233, and/or other forecasts. As will be described, the mixture model forecasting engine 218 is configured to generate such forecasts by applying appropriate weighting to forecast models for each of several different host types employed in the data centers 206.

The data stored in the data store 212 includes, for example, hardware footprint forecasts 221, service forecasts 224, network usage history 236, host type information 239, training data sets 242, mixture model computing hardware forecasts 227, mixture model network usage forecasts 230, mixture model network hardware forecasts 233, mixture model configuration parameters 245, and potentially other data. The hardware footprint forecasts 221 may provide actual and projected hardware capacity at the data centers 206. For example, the hardware footprint forecasts 221 may indicate a number of racks or rack units and/or a number of spaces for racks and/or rack units at each of the data centers 206, including planned data centers 206 that have yet to be constructed. The hardware capacity described by the hardware footprint forecasts 221 may correspond to generic hardware capacity or hardware capacity reserved for, or presently in use by, specific types of computing hardware.

The service forecasts 224 may provide usage forecasts for various services offered by an organization via the data centers 206. Such services may correspond to data storage services, database services, utility computing services, electronic commerce services, and/or other services. The service forecasts 224 may be provided in terms of predicted network usage, predicted computing hardware usage (e.g., racks, rack units, computing devices, etc.), predicted host usage, and so on. The service forecasts 224 may be provided in various dimensions of usage, such as predicted usage of a network link between a first network node and a second network node, predicted usage of a specific type of computing device, predicted usage of a specific type of host (which may be implemented using several different computing device types), and/or other dimensions of usage.

The network usage history 236 may provide historical time series data for usage of various links within the network 209. For example, the network usage history 236 may describe historical bandwidth consumption on a link between a first data center 206 and a second data center 206, or more generally, a link between a first node and a second node, where nodes may correspond to load balancers, routers, switches, or other types of network hardware. The network usage history 236 may also indicate historical numbers of hosts in data centers 206 coupled to the network 209.

The host type information 239 may provide data regarding various types of hosts in the data centers 206. A host may correspond to an actual machine or to a virtual machine. A virtual host is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each host may be controlled by different customers, who may have administrative access only to their own instance(s) and no access to the instances of other customers. Multiple hosts may in fact execute concurrently on a computer system including parallel processors, although multiple instances may appear to execute concurrently on a multithreaded computer system with fewer processors than instances.

Different types of hosts may be available. For example, a first host type may be optimized for data storage, a second host type may be optimized for computation, a third host type may be optimized for system memory, a fourth host type may be optimized for graphics processing, and a fifth host type may be a general purpose host. Each of these types of hosts may be available in multiple sizes, e.g., small, medium, and large. As a non-limiting example, a large general purpose host may have four CPU-equivalent units, 15 GB of system memory, and 1,000 GB of data storage. A medium general purpose host may have two CPU-equivalent units, 10 GB of system memory, and 500 GB of data storage. A small general purpose host may have one CPU-equivalent unit, 5 GB of system memory, and 250 GB of data storage. In one embodiment, a host may comprise an allocation of an entire computing device with no virtualization.

It is noted that different types of hosts may be associated with different network usage profiles. For example, a type of host that is frequently used to implement a storage service may frequently implement sharding and assembling shards for storage. Such a storage service may indicate a high rate of data transfer. By contrast, a type of host that is optimized for computation may exhibit relatively little bandwidth consumption.

In various embodiments, a customer may be capable of launching new hosts and/or terminating hosts dynamically. Thus, the data centers 206 may provide elastic computing capability to the customer that can vary over time. As a non-limiting example, a customer hosting an infrequently visited network site on a host may suddenly get an influx of network page hits when the network site is mentioned on television or linked on a popular network site. The increase in network site traffic may overwhelm the computing capability of the host, leading to poor network site performance and availability. To cope with the network site traffic, the customer may launch new hosts and/or transition to a host with more resources and better performance.

The training data sets 242 include data employed for training various network and/or hardware usage models for the mixture model forecasting engine 218. The training data set 242 may include, for example, a subset of the network usage history 236.

The mixture model computing hardware forecasts 227, the mixture model network usage forecasts 230, and the mixture model network hardware forecasts 233 correspond to forecasts generated by the mixture model forecasting engine 218 as will be described. The mixture model computing hardware forecasts 227 predict types of computing hardware (e.g., racks of computing devices, etc.) according to the mixture model. The mixture model computing hardware forecasts 227 may specify a respective predicted quantity for each of several different host types.

The mixture model network usage forecasts 230 predict network usage (e.g., peak bandwidth consumption) for various links within the network 209. In one embodiment, the mixture model network usage forecasts 230 may be generated using a mixture model computing hardware forecast 227 and the network usage history 236. The mixture model network hardware forecasts 233 predict network hardware to handle peak network usage. Such mixture model network hardware forecasts 233 may be based upon mixture model network usage forecasts 230 or may be calculated directly. Such mixture model network hardware forecasts 233 may predict quantities and types of network routers, load balancers, optical fiber connections, and/or other network hardware to provide sufficient network capacity to handle the peak predicted network usage.

The mixture model configuration parameters 245 include various parameters and/or other data that configure the operation of the mixture model forecasting engine 218. Such mixture model configuration parameters 245 may include threshold values, repetition parameters, weights, time horizons, and/or other parameters that are utilized by the mixture model forecasting engine 218.

Next, a general description of the operation of the various components of the networked environment 200 is provided. To begin, a network measurement service 215 executes and monitors the usage of the network 209 by the data centers 206 over time. Consequently, network usage history 236 is generated. Engineers or other users may create hardware footprint forecasts 221 based at least in part on build-out schedules for data centers 206. Service forecasts 224 may be generated based upon network usage history 236 for various services. Alternatively, the service forecasts 224 may be provided by entitles in charge of the various services. The host type information 239 may be created based upon computing devices available or planned in the data centers 206 and what types of hosts are available for those computing devices. One or more training data sets 242 may be created based upon the network usage history 236, the hardware footprint forecasts 221, the service forecasts 224, and/or other input data.

The mixture model forecasting engine 218 is then invoked to generate one or more combination forecasts using a mixture model. Such forecasts may include, for example, mixture model computing hardware forecasts 227, mixture model network usage forecasts 230, mixture model network hardware forecasts 233, and/or other forecasts. The operation of the mixture model forecasting engine 218 is controlled by the mixture model configuration parameters 245.

Figure 3A:
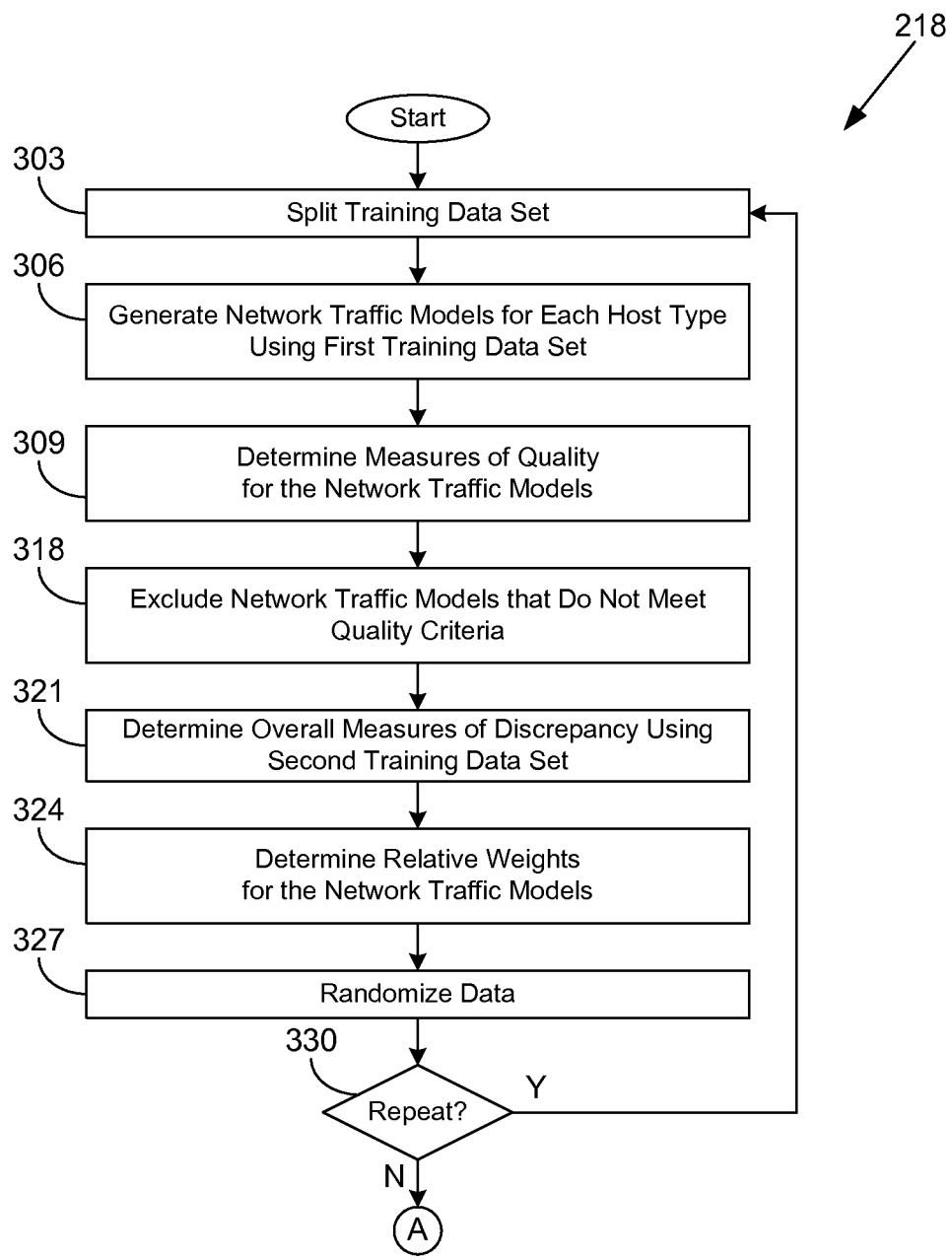
FIGS. 3A and 3B depict a flowchart illustrating one example of functionality implemented as portions of a mixture model forecasting engine executed in a computing environment in the networked environment of FIG. 2 according to various embodiments of the present disclosure.
Figure 3B:
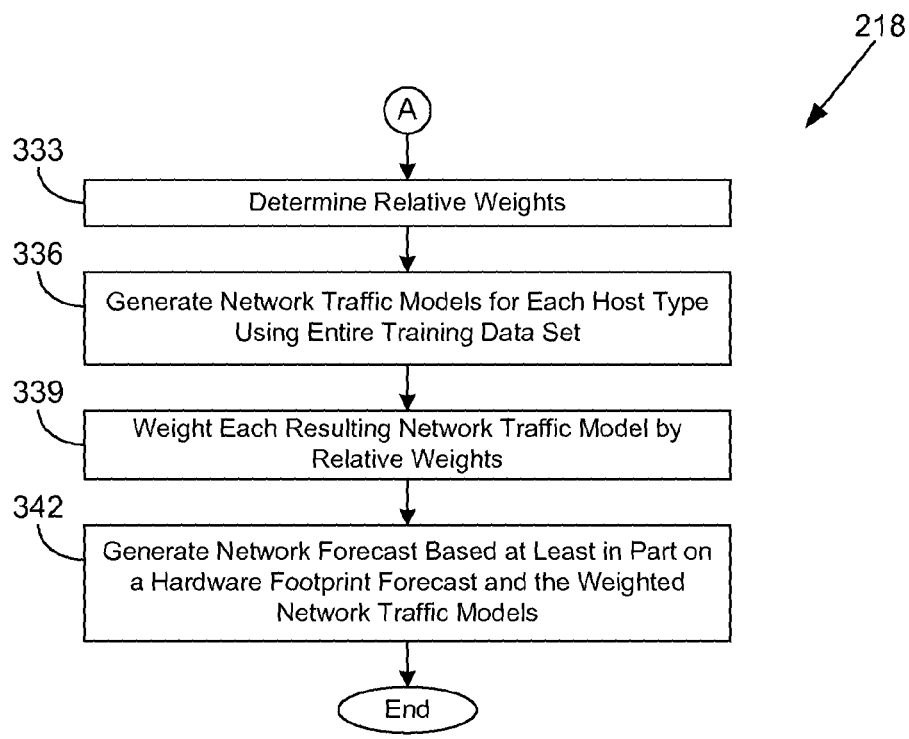

Referring next to FIGS. 3A and 3B, shown is a flowchart that provides one example of the operation of a portion of the mixture model forecasting engine 218 according to various embodiments. The portion as shown implements an adaptive regression by mixing with model screening. It is understood that the flowchart of FIGS. 3A and 3B provides merely an example of the many different types of functional arrangements that may be employed to implement the operation of the portion of the mixture model forecasting engine 218 as described herein. As an alternative, the flowchart of FIGS. 3A and 3B may be viewed as depicting an example of steps of a method implemented in the computing environment 203 (FIG. 2) according to one or more embodiments.

Beginning with box 303 of FIG. 3A, the mixture model forecasting engine 218 obtains a training data set 242 (FIG. 2) from the data store 212 (FIG. 2) and splits the training data set 242 into a first portion and a second portion. Such first and second portions may be disjoint sets. In box 306, the mixture model forecasting engine 218 generates network traffic models for each host type as described in the host type information 239 (FIG. 2) using the first portion of the training data set 242.

In box 309, the mixture model forecasting engine 218 determines one or more measures of quality for the network traffic models. For example, the mixture model forecasting engine 218 may determine error variance values for each of the network traffic models, Akaike information criterion (AIC) values for each of the network traffic models, Bayesian information criterion (BIC) values for each of the network traffic models, and/or other measures of quality. In box 318, the mixture model forecasting engine 218 excludes any of the network traffic models that do not meet quality criteria (e.g., both AIC and BIC criteria) from consideration in the forecast.

In regards to AIC values, the mixture model forecasting engine 218 may compute a delta AIC value for each network traffic model, which is the particular AIC value minus the minimum AIC value for all of the network traffic models. A delta AIC value less than 2 suggests substantial evidence for a particular model, while a delta AIC value greater than 10 suggests that the model is very unlikely. In one embodiment, network traffic models having a delta AIC of 10 or greater are excluded from consideration in the forecast. Likewise, delta BIC values may be computed for each network traffic model. In one embodiment, network traffic models having a delta BIC of 10 or greater are excluded from consideration in the forecast.

In box 321, the mixture model forecasting engine 218 assesses the accuracy of the network traffic models by determining overall measures of discrepancy using the second portion of the training data set 242. Corresponding network traffic models for each host type may be computed using the second portion of the training data set 242, and the sum of squares error between the predictions of the network traffic models and the first portion of the training data set 242 may be determined.

In box 324, the mixture model forecasting engine 218 determines relative weights for each of the network traffic models for the host types. In doing so, the mixture model forecasting engine 218 may calculate a numerator value for each network traffic model as follows: $\text{variance}^{-n} \times e^{-(\text{variance}_2 \times \text{discrepancy}/2)}$, where variance is the error variance value for the model, n is an observation from the first portion of the training data set 242, and discrepancy is the overall measure of discrepancy for the model. The relative weight may then be derived by dividing the numerator value by the sum of all the numerator values. In box 327, the mixture model forecasting engine 218 may randomly permute the order of the data in the training data set 242.

In box 330, the mixture model forecasting engine 218 determines whether to repeat the previous tasks. In one embodiment, the tasks of boxes 303-327 may be repeated N times using the differently randomized data. If the tasks are to be repeated, the mixture model forecasting engine 218 returns to box 303. If not, the mixture model forecasting engine 218 continues from box 330 to box 333 of FIG. 3B.

In box 333 of FIG. 3B, the mixture model forecasting engine 218 determines relative weights from the relative weights computed during the N iterations. For example, the mixture model forecasting engine 218 may determine the average relative weights, the median relative weights, the maximum relative weights, the minimum relative weights, and so on, from the relative weights determined in box 324. In box 336, the mixture model forecasting engine 218 generates network traffic models for each host type using the entire training data set 242 (FIG. 2). In box 339, the mixture model forecasting engine 218 weights each resulting network traffic model by the corresponding relative weights. In box 342, the mixture model forecasting engine 218 generates a network forecast based at least in part on a hardware footprint forecast 221 (FIG. 2) and the weighted network traffic models. Thereafter, the portion of the mixture model forecasting engine 218 ends.

As described, the generated forecast may be a mixture model network usage forecast 230 (FIG. 2). However, in another embodiment, the generated forecast may be a mixture model computing hardware forecast 227 (FIG. 2). In such an embodiment, the models generated may be hardware usage models or host type usage models rather than network traffic models. In another embodiment, mixture model network hardware forecasts 233 (FIG. 2) may be generated. In one case, mixture model network hardware forecasts 233 may be generated from mixture model network usage forecasts 230 as input along with data correlating the types of network hardware to provide network capacity for the worst case usage predicted by a mixture model network usage forecast 230.

Figure 4:
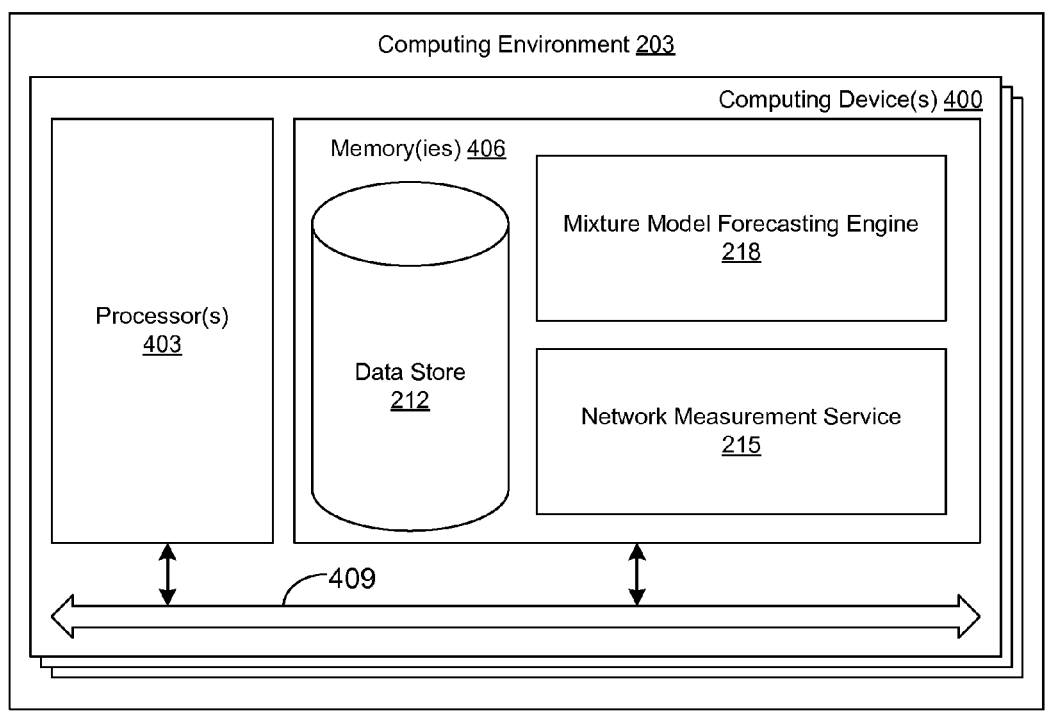
FIG. 4 is a schematic block diagram that provides one example illustration of a computing device employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer, at least one client computer, or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are a network measurement service 215, a mixture model forecasting engine 218, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network measurement service 215, the mixture model forecasting engine 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIGS. 3A and 3B shows the functionality and operation of an implementation of portions of the mixture model forecasting engine 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIGS. 3A and 3B shows a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network measurement service 215 and the mixture model forecasting engine 218, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network measurement service 215 and the mixture model forecasting engine 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   generate respective network traffic models for individual ones of a plurality of host types, the plurality of host types including at least one of: a host type optimized for data storage, a host type optimized for computation, or a host type optimized for system memory, wherein the respective network traffic models are generated using a first training data set;

determine respective weights for individual ones of the respective network traffic models based at least in part on at least one of: respective error variance values, respective Akaike information criterion (AIC) values, respective Bayesian information criterion (BIC) values, or respective overall measures of discrepancy for the individual ones of the respective network traffic models, wherein the respective overall measures of discrepancy assess a respective accuracy of the individual ones of the respective network traffic models using a second training data set; and generate a network forecast that predicts network traffic between a first node and a second node based at least in part on a hardware footprint forecast defining a respective predicted number of racks at a data center and on the respective network traffic models weighted by the respective weights.

2. The non-transitory computer-readable medium of claim 1, wherein when executed the program causes the at least one computing device to at least generate a forecast for networking hardware to handle the network traffic predicted by the network forecast.

3. A system, comprising:
at least one computing device; and
a mixture model forecasting engine executable in the at least one computing device, wherein when executed the mixture model forecasting engine causes the at least one computing device to at least:
generate respective network traffic models for individual ones of a plurality of host types, the plurality of host types including at least one of: a host type optimized for data storage, a host type optimized for computation, or a host type optimized for system memory, wherein the respective network traffic models are generated using a first training data set;
determine respective weights for individual ones of the respective network traffic models based at least in part on at least one of: respective error variance values, respective Akaike information criterion (AIC) values, respective Bayesian information criterion (BIC) values, or respective overall measures of discrepancy for the individual ones of the respective network traffic models, wherein the respective overall measures of discrepancy assess a respective accuracy of the individual ones of the respective network traffic models using a second training data set; and
generate a network forecast based at least in part on a hardware footprint forecast defining a respective predicted number of racks at a data center and on the respective network traffic models weighted by the respective weights.

4. The system of claim 3, wherein the network forecast indicates a measure of network capacity to handle predicted network traffic between a first data center and a second data center that are covered by the hardware footprint forecast.

5. The system of claim 3, wherein the mixture model forecasting engine when executed further causes the at least one computing device to at least:
determine the respective AIC values for the individual ones of the respective network traffic models; and
exclude at least one of the respective network traffic models from consideration in generating in the network forecast based at least in part on the respective AIC values.

6. The system of claim 3, wherein the mixture model forecasting engine when executed further causes the at least one computing device to at least:
determine the respective BIC values for the individual ones of the respective network traffic models; and
exclude at least one of the respective network traffic models from consideration in generating the network forecast based at least in part on the respective BIC values.

7. The system of claim 3, wherein the mixture model forecasting engine when executed further causes the at least one computing device to at least:
determine the respective error variance values for the individual ones of the respective network traffic models; and
wherein the determination of the respective weights is based at least in part on the respective error variance values.

8. The system of claim 3, wherein the mixture model forecasting engine when executed further causes the at least one computing device to at least:
determine the respective overall measures of discrepancy using two disjoint training data sets for the individual ones of the respective network traffic models; and
wherein the determination of the respective weights is based at least in part on the respective overall measures of discrepancy.

9. The system of claim 3, wherein the determination of the respective weights is based at least in part on a plurality of randomizations of a third training data set.

10. A method, comprising:
generating, by a computing device, respective network traffic models for individual ones of a plurality of host types, the plurality of host types including at least one of: a host type optimized for data storage, a host type optimized for computation, or a host type optimized for system memory, wherein the respective network traffic models are generated using a first training data set;
determining, by the computing device, respective weights for individual ones of the respective network traffic models based at least in part on at least one of: respective error variance values, respective Akaike information criterion (AIC) values, respective Bayesian information criterion (BIC) values, or respective overall measures of discrepancy for the individual ones of the respective network traffic models, wherein the respective overall measures of discrepancy assess a respective accuracy of the individual ones of the respective network traffic models using a second training data set; and
generating, by the computing device, a network forecast based at least in part on a hardware footprint forecast defining a respective predicted number of racks at a data center and on the respective network traffic models weighted by the respective weights.

11. The method of claim 10, wherein the network forecast is generated using a mixture model.

12. The method of claim 10, wherein the network forecast comprises a time series specifying a respective predicted quantity for each of the plurality of host types.

13. The method of claim 10, further comprising generating, by the computing device, the network forecast based at least in part on historical network traffic data associated with the plurality of host types.

14. The method of claim 13, wherein the network forecast indicates predicted network traffic between a first network node and a second network node.

15. The method of claim 10, further comprising:
determining, by the computing device, the respective AIC values for individual ones of the respective network traffic models;
determining, by the computing device, the respective BIC values for individual ones of the respective network traffic models; and
excluding, by the computing device, at least one of the respective network traffic models from consideration in generating the network forecast based at least in part on at least one of: the respective AIC values or the respective BIC values.

16. The non-transitory computer-readable medium of claim 1, wherein the network forecast indicates a measure of network capacity to handle predicted network traffic between a first data center and a second data center that are covered by the hardware footprint forecast.

17. The non-transitory computer-readable medium of claim 1, wherein the determination of the respective weights is based at least in part on a plurality of randomizations of a third training data set.

18. The non-transitory computer-readable medium of claim 1, wherein the network forecast is generated using a mixture model.

19. The non-transitory computer-readable medium of claim 1, wherein the network forecast is generated based at least in part on historical network traffic data associated with the plurality of host types.

20. The system of claim 3, wherein the network forecast is generated based at least in part on historical network traffic data associated with the plurality of host types.

* * * * *